Nov. 19, 1957  A. B. PRATT  2,813,484
INKER CONTROL FOR ROTARY DUPLICATING APPARATUS
Filed March 25, 1954  8 Sheets-Sheet 1

INVENTOR.
ADRIAN B PRATT
BY
Bates, Teare, & McKean
ATTORNEYS

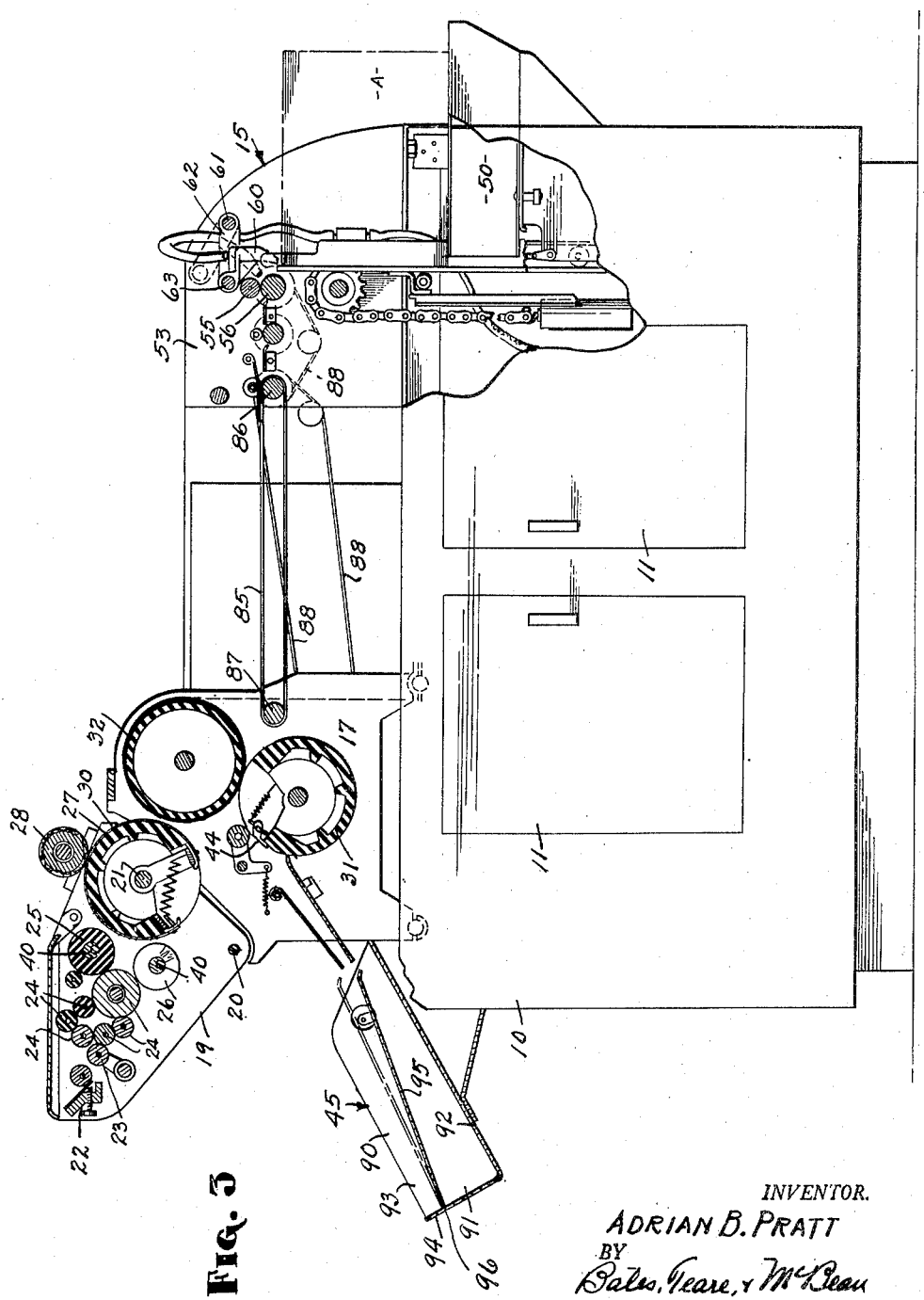

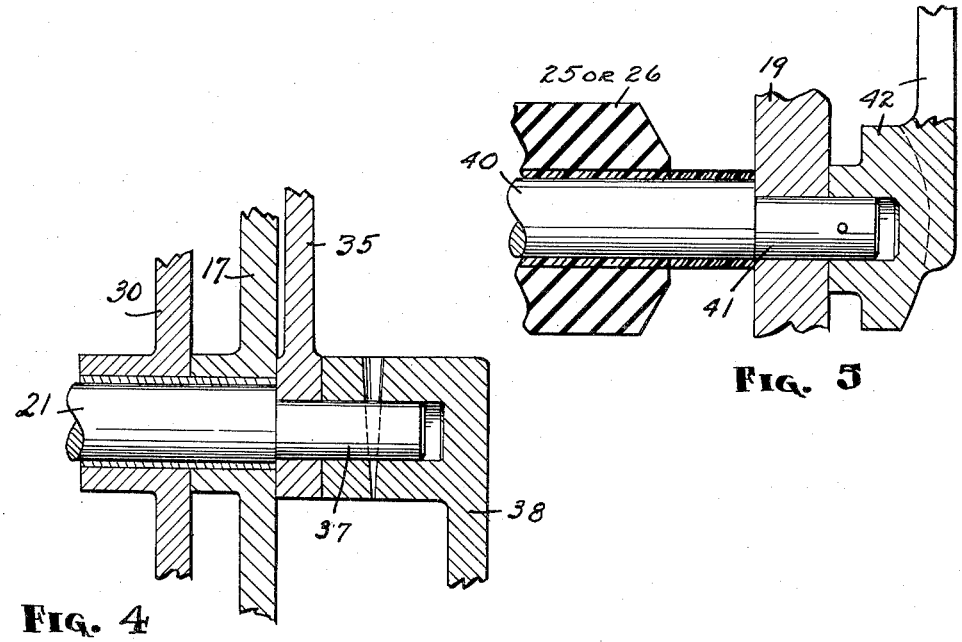
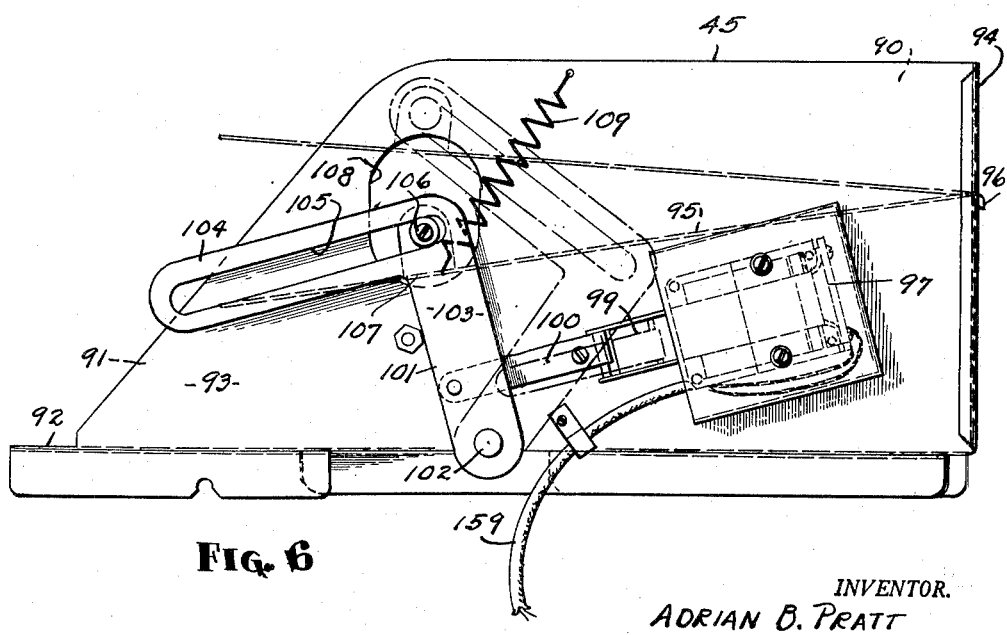

Nov. 19, 1957  A. B. PRATT  2,813,484
INKER CONTROL FOR ROTARY DUPLICATING APPARATUS
Filed March 25, 1954  8 Sheets-Sheet 4
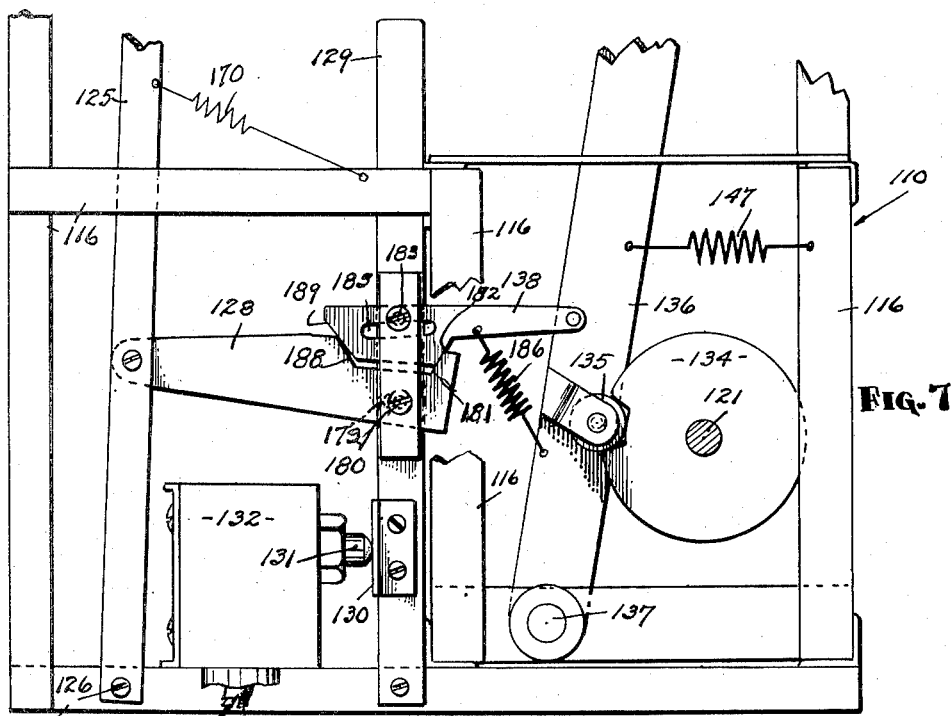
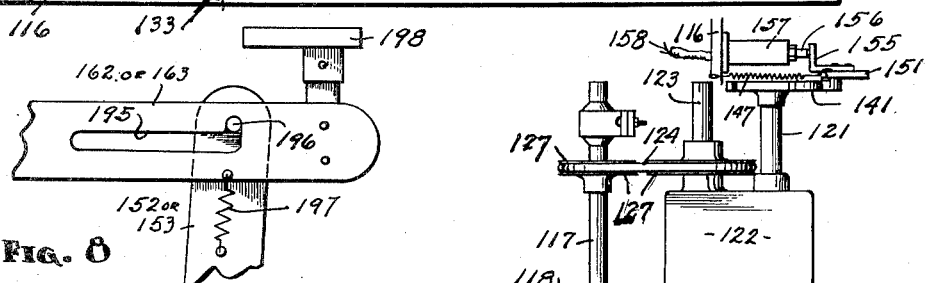
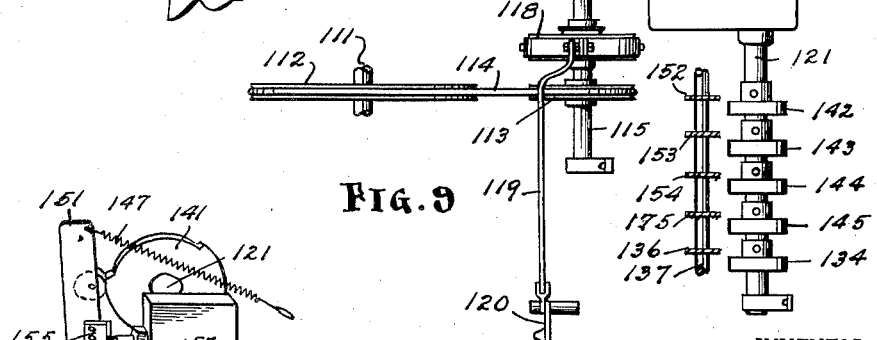
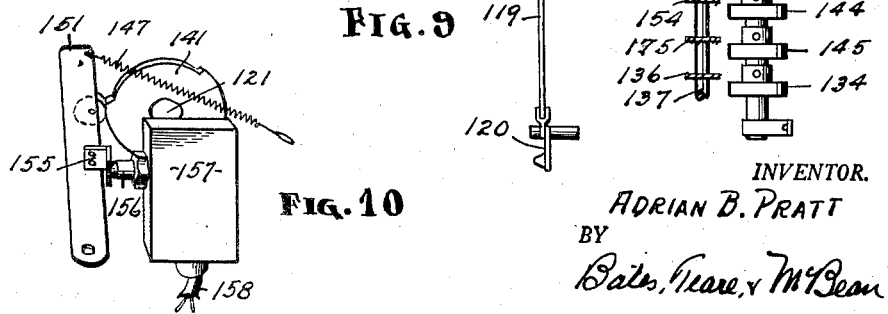
INVENTOR.
ADRIAN B. PRATT
BY
Bates, Teare, y McBean
ATTORNEYS

INVENTOR
ADRIAN B. PRATT

Nov. 19, 1957   A. B. PRATT   2,813,484
INKER CONTROL FOR ROTARY DUPLICATING APPARATUS
Filed March 25, 1954   8 Sheets-Sheet 6
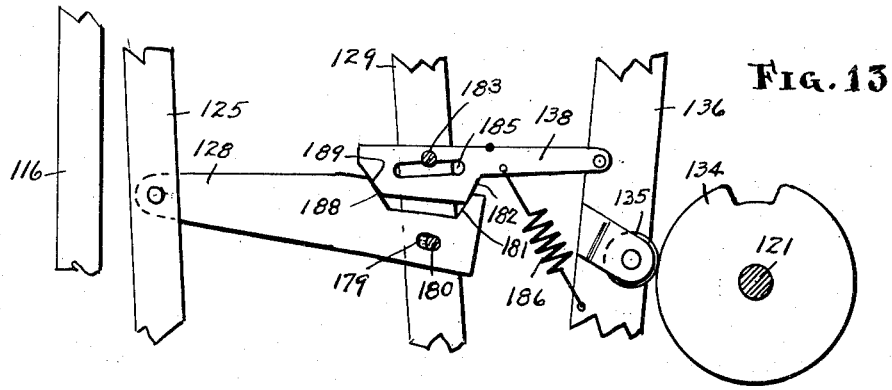
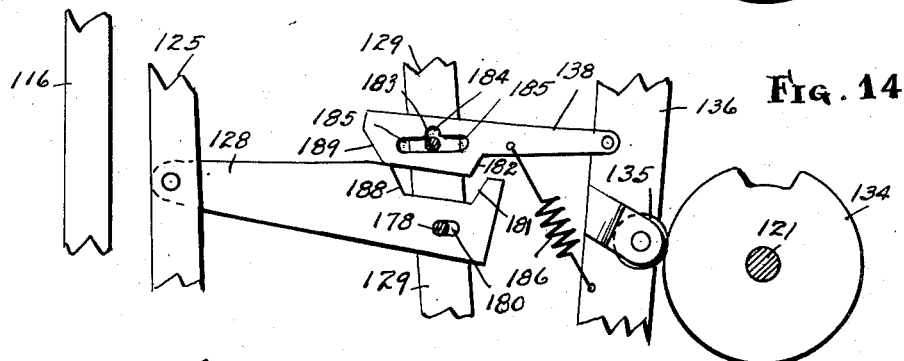
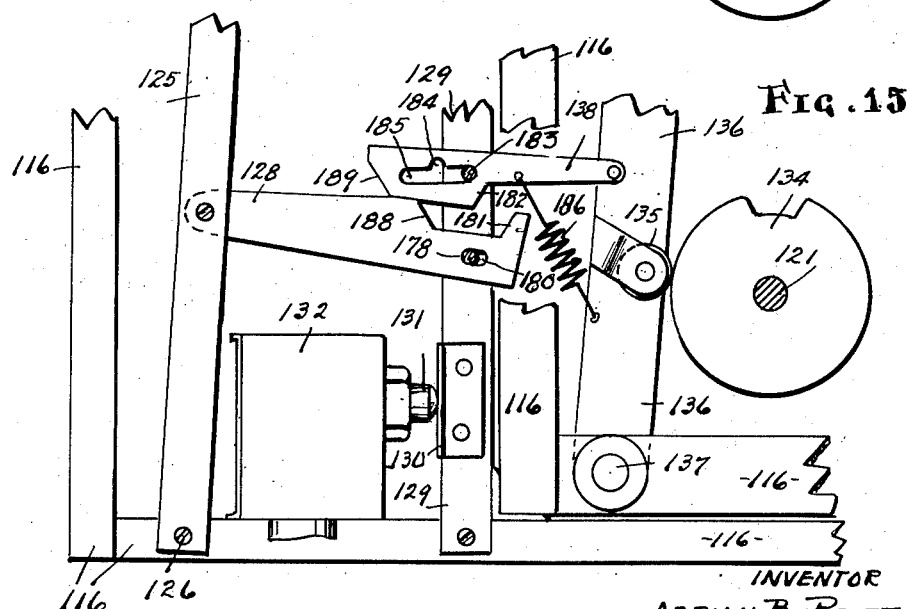
INVENTOR
ADRIAN B. PRATT
By Bates, Teare, & McKee
ATTORNEYS

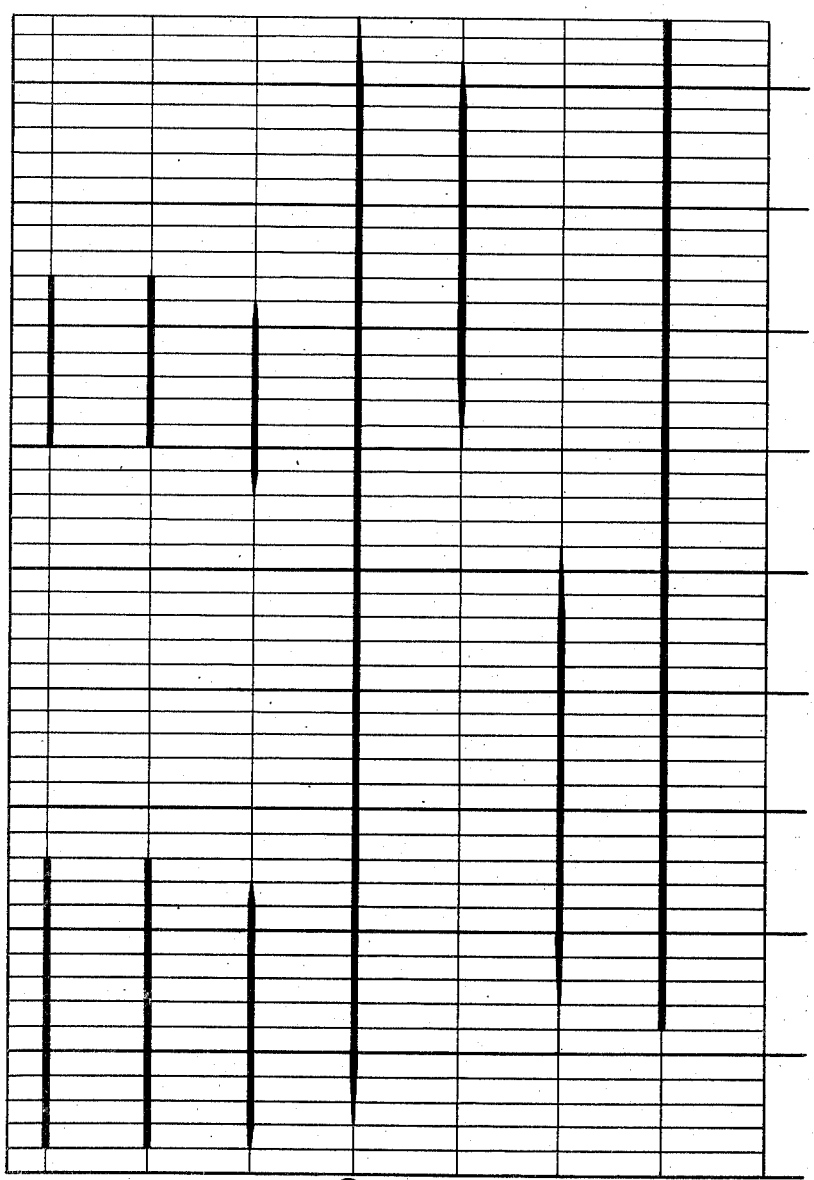

Nov. 19, 1957  A. B. PRATT  2,813,484
INKER CONTROL FOR ROTARY DUPLICATING APPARATUS
Filed March 25, 1954  8 Sheets-Sheet 8

INVENTOR
ADRIAN B. PRATT
By
Bates, Teare, & McKean
ATTORNEYS

United States Patent Office 2,813,484
Patented Nov. 19, 1957

2,813,484

INKER CONTROL FOR ROTARY DUPLICATING APPARATUS

Adrian B. Pratt, Westwood, N. J., assignor to Addressograph-Multigraph Corporation, Cleveland, Ohio, a corporation of Delaware Application March 25, 1954, Serial No. 418,636

36 Claims. (Cl. 101—144)

This invention relates to improvements in or relating to duplicating machines, and particularly to an improved control mechanism therefor. These, therefore, are the general objects of the present invention.

At the present time duplicating machines are used to imprint business records and papers to provide a relatively small number of imprints from each of a series of master printing or duplicating plates. In many instances it has been found desirable to imprint several business forms with a portion of the data or image carried by the master or printing plate, and to thereafter imprint several other forms with all of the data on the printing plate. In the past such an operation has required the manipulation of several individual controls by the operator and the results have been far from satisfactory, particularly where comparatively unskilled operators are employed. Accordingly a more specific object of this invention is to provide a control mechanism which will so control the operation of the duplicating mechanism as to reduce the number of manual operations to a minimum and thereby overcome the disadvantages heretofore encountered.

According to this invention there is provided a power operated duplicating machine including a rotary printing mechanism of the type having a rotary master cylinder to receive removable master or printing plates and which is movable to and from cooperation with a coacting imprinting means, which may include an offset or transfer cylinder which coacts with the master cylinder and with a platen cylinder to transfer an inked image from the printing plate to a work sheet passed between the last two cylinders. In addition the machine is provided with a pair of ink applicator units which apply ink to the master and each of which is capable of being selectively made active or inactive as desired. If desired one of these units may be arranged to ink a selected portion only of the master printing plate. The entire mechanism is power driven and is provided with a power driven sheet feeder adapted to feed proof or cleaning sheets, sometimes called "run-down" sheets, one at a time to the printing mechanism. The invention provides a control mechanism which, when actuated by the operator, will control the various mechanisms in such manner that the operation of a single control member by the operator will cause the duplicating machine controls to be automatically actuated in a predetermined sequence during a predetermined number of successive cycles of operation of the printing mechanism following which the operation of the machine will be automatically stopped.

For instance, the operation of the single control may first actuate a switch to start the duplicating mechanism motor and render the control mechanism active to retain such motor operating; after a predetermined number of cycles of operation have been completed, for instance, two, the control mechanism will cause the master cylinder to move into printing contact with imprinting means, for instance, a transfer or offset cylinder; and following say five additional cycles the control will cause one inking applicator, which inks a portion only of the master plate, to become active for a predetermined number of additional cycles during which the operator may feed the desired number of forms to the printing mechanism; the control then renders such inking unit inactive and a second inking unit active to ink a portion only of the master; the machine then continues for a predetermined number of additional cycles of operation during which the operator feeds a second set of forms to the printing mechanism; following this the control operates to cause the second inking unit to move to an idle position and thereafter stop the driving motor.

Further, according to this invention the control mechanism may function to render the sheet feeder active to feed a predetermined number of run-down sheets to the printing mechanism prior to the making of each set of impressions to thereby insure proper inking of the master before such imprints are made.

Further, according to the invention the manually fed imprinted work sheets may be separated from the automatically fed "run-down" sheets as they are discharged from the printing mechanism. For this purpose a movable sheet receiving receptacle having two compartments is provided, one of the compartments being for discharged imprinted work sheets and the other for discharged run-down sheets. Suitable mechanism responsive to the control is provided to position the proper compartment to receive the sheets being discharged.

Further, according to the invention a manually operable control may be provided to permit the operator to set the entire mechanism for manual operation, such control being so arranged that when it is desired to resume automatic operation the various mechanisms will synchronize automatically. Likewise a manually automatic cut-out control may be provided, the actuation of which will stop the machine at any time during any cycle of automatic operation. Such control is arranged to retain the machine idle until it is again activated by its operation.

Other objects and advantages of this invention will become more apparent from the following description which refers to one embodiment of the invention illustrated in the accompanying drawing, in which:

Fig. 3 is an enlarged substantially central longitudinal vertical section through the duplicating and sheet feeder mechanism, the plane of such section being substantially parallel to that of Figs. 1 and 2;

Fig. 4 is a sectional detail of a mechanism for separating the master and offset cylinders, the plane of the section being indicated by the lines 3—3 on Fig. 1;

Fig. 5 is a sectional detail illustrating a portion of a mechanism for moving the ink applicator rolls to and from contact with the master cylinder, the planes of the section being indicated by the lines 5—5 on Fig. 1;

Fig. 6 is an enlarged side elevation of the sheet receiving receptacle and a portion of its operating mechanism as viewed from the side of the machine opposite that illustrated in Fig. 1;

Fig. 7 is an enlarged side elevation of a portion of the control mechanism;

Fig. 8 is a sectional detail of a portion of the control mechanism;

Fig. 9 is a diagrammatic plan view illustrating the drive for the control mechanism;

Fig. 10 is a perspective view of a switch control mechanism used to actuate a signal advising the operator that work sheets should not be fed;

Figs. 11, 12, 13, 14 and 15 are views similar to Figs. 7 illustrating various positions and relationships of the parts therein shown;

Fig. 16 is a timing diagram for the control mechanism;

Figure 1:
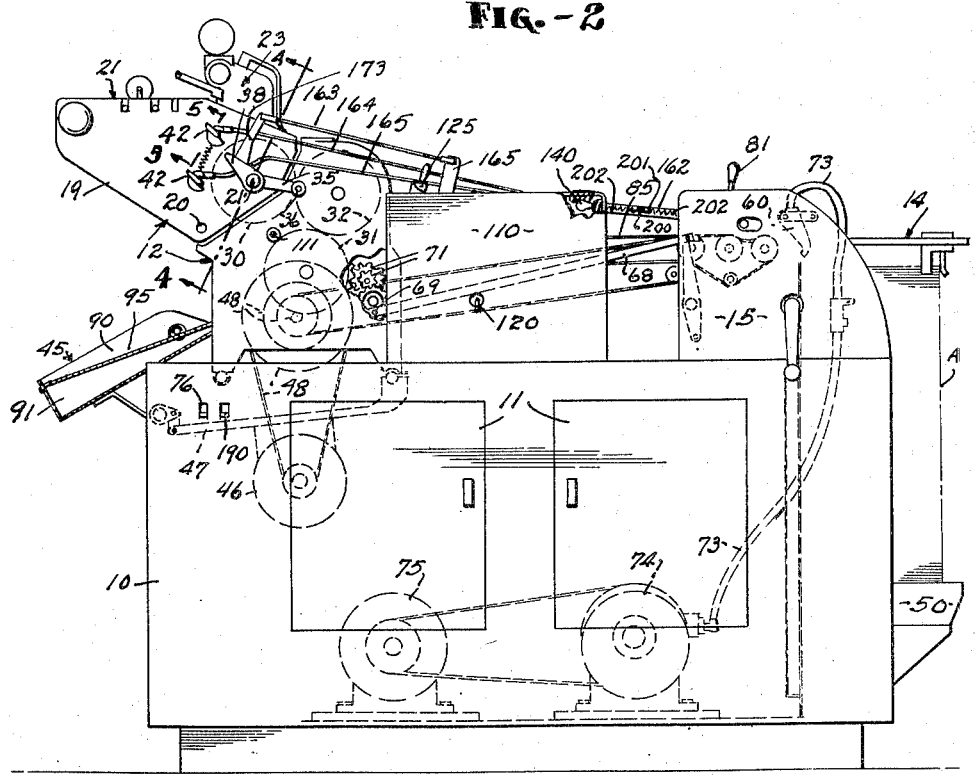
Fig. 1 is a side elevation of the complete duplicating mechanism.
Figure 11:
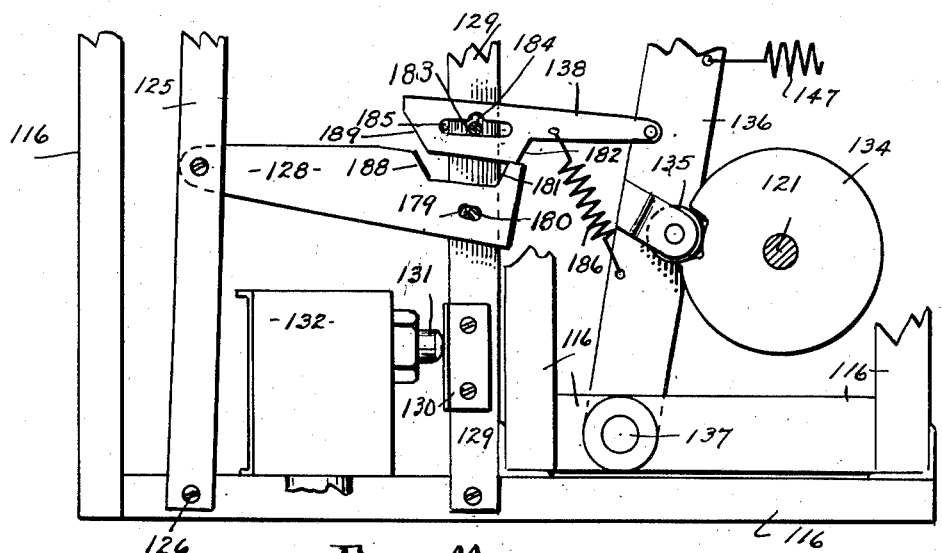
Figure 12:
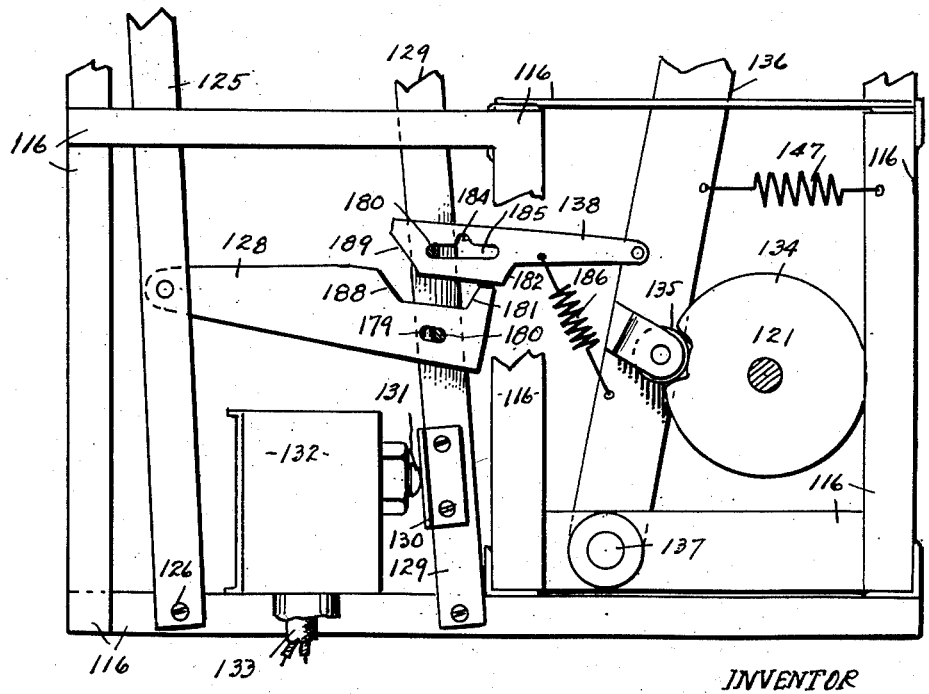
Figure 18:
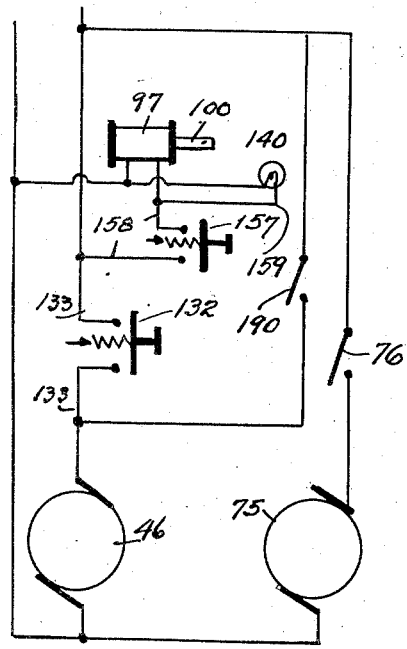
Fig. 18 is a wiring diagram illustrating the electrical circuits.
Figure 17:
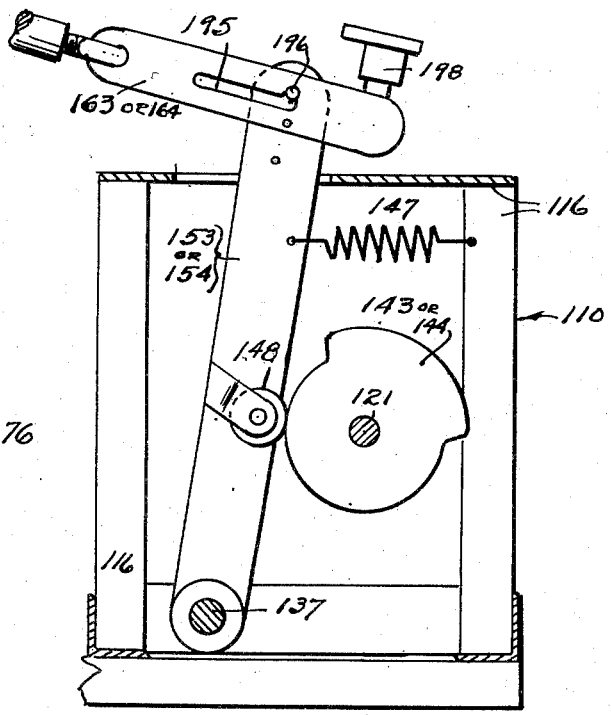
Fig. 17 is a view similar to Fig. 7 illustrating a portion of the lever mechanism for rendering the ink form rolls active or inactive.
Figure 19:
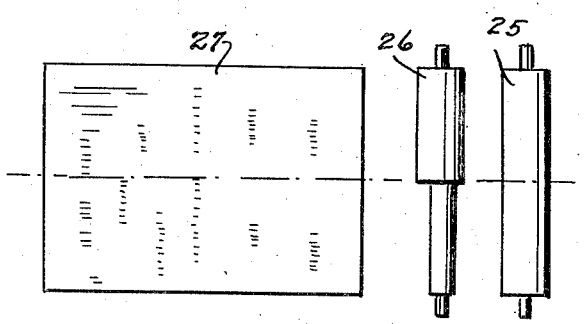
Figs. 19 and 20 are diagrammatic illustrations of the possible relationship between a master plate and the inking rolls.

The duplicating machine as illustrated in Fig. 1 is preferably mounted on a cabinet-like frame or base 10 provided with doors 11 to permit access to the interior thereof. A printing mechanism 12 is mounted on the cabinet 10 at the left hand end thereof. A stack or pile support 14 is mounted at the opposite end of the cabinet and support a stack of "run-down" sheets "A" to be fed one at a time to the printing mechanism for purposes hereinafter to be more fully explained. Above the pile or stack support 14 there is a sheet separating device 15 to separate the top "run-down" sheet from the stack and progress it to a sheet forwarding mechanism 16 interposed between the separating device 15 and the printing mechanism 12.

*Printing mechanism*

Figure 2:
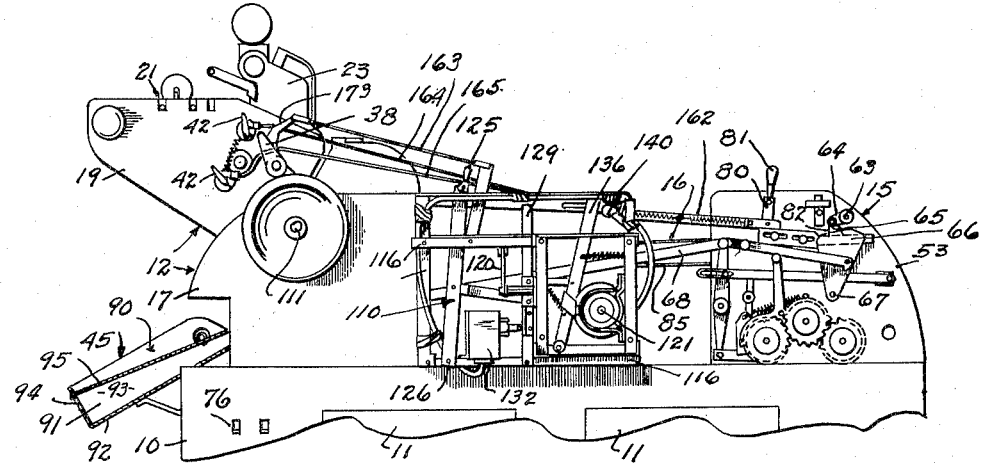
Fig. 2 is a view similar to Fig. 1 with portions of the cover plates removed to illustrate portions of the operating and control mechanisms, the lower portion of the machine, comprising the base, being broken away.

The printing mechanism as illustrated in Figs. 1, 2 and 3 includes a pair of spaced side plates or frames 17 supported by cross frame members 18 of the cabinet 10. A platen cylinder 31 and a transfer or offset cylinder 32 are rotatably journaled in the frame plates 17. A pair of spaced supplemental side frame members or plates 19 are secured together by suitable spacing members, not shown, and are pivotally mounted on a transverse rod 20 carried by the frame plates 17. A master or form cylinder 30 is journaled on a shaft 21 which extends between and is rotatively mounted in the supplemental frame members 19. An inking mechanism is also mounted in the supplemental frame.

The inking mechanism may include an ink fountain 22, a ductor roll 23, a series of distributor rolls 24 which transfer the ink to each of a pair of form rolls 25 and 26, hereinafter more fully described. The form rolls apply ink to a printing plate or master 27 which is removably secured to and extends about the periphery of the master cylinder 30. The supplemental frame also supports a repellent applicator mechanism 28 which applies an ink repellent to the master printing plate 27 in the usual manner.

The supplemental frame is positioned by a pair of links, one of which is shown in Figs. 1 and 4 at 35, the other of which is at the opposite side of the machine. One end of each link 35 is pivoted as at 36 to its respective main frame plates 17. The other end of each link is pivotally mounted on respective eccentric outer ends 37 of the master cylinder shaft 21. Accordingly, the rocking of the shaft 21, as will be hereinafter explained, will move the the supplemental frame 19 together with the master cylinder 30 and ink and repellent applicator mechanisms bodily to and from the offset or transfer cylinder 32, thereby moving the master cylinder 30 into and out of printing engagement with the transfer cylinder 32. The shaft 21 is provided with a lever or knob 38 by means of which it may be rotated to position the supplemental frame and accordingly the master cylinder as desired.

Each form roll 25 and 26 is mounted for movement into and out of engagement with the master or printing plate 27 carried by the master cylinder 30. As indicated in Fig. 5 each form roll is mounted on a shaft 40 having eccentric end portions 41 which are journaled in the supplemental frame plates 19. One of the eccentric portions 41 extends through its associated frame member 19 and carries, on its outer end, a lever or knob 42 by means of which the shaft may be rocked to and bring the associated ink form roll into and out of cooperation with the printing plate 27.

Sheets to be printed may be placed on a series of moving tapes 85 which forward them to a sheet gripper 44 carried by the platen roller 31. Suitable timing devices, not shown, are provided to accurately time the entrance of the sheet to the grippers. Likewise a sheet ejector mechanism, a portion of which is generally indicated at 49 cooperates with the gripper 44 to strip the imprinted sheet from the platen roller 31 and guide it to a discharge receptacle 45.

The printing mechanism above described is of the general planographic type and a more detailed description thereof, including the mounting of the printing plate, the mounting of the form rolls, the sheet gripping and stripping mechanism, stop fingers for controlling the time of entrance of the sheet to the grippers, and various other details may be had by reference to Patent No. 1,968,849 issued to my assignee August 7th, 1934. The inking mechanism therein illustrated utilizes but one form roll, however, a suitable inking mechanism having a pair of form rolls is shown in Patent No. 2,065,535 issued to my assignee December 29, 1936.

The printing mechanism is driven by an electric motor 46 mounted on a bracket 47 disposed within the cabinet 10. This motor is drivingly connected with the platen cylinder 32 by driving elements, for instance, belts, pulleys and gears 48. The master cylinder 30, the transfer cylinder 31, and the platen cylinder 32 are provided with interengaging gearing, not shown, so that each cylinder will be driven in synchronism with the other.

*"Run-down" sheet feed*

The "run-down" sheets are stored or placed in a pile or stack on the support 14. This support includes a table or platform 50 on which the stack rests. This table is slidably mounted for vertical movement in the cabinet 10 and is raised automatically at predetermined intervals to maintain the uppermost sheet in the stack substantially in a predetermined horizontal plane where it may be engaged conveniently by the sheet separating mechanism 15. One form of separating mechanism suitable for use is fully shown and described in Patents Nos. 2,293,046 and 2,358,560 issued to my assignee August 18, 1942 and September 19, 1944 respectively, while reference may be had to Patent No. 2,358,560, heretofore mentioned, for the details of a suitable mechanism to periodically raise the table 50 and retain the top of the stack at a predetermined elevation.

The uppermost sheet in a stack of run-down sheets is separated from the stack by the sheet separating mechanism 15. Briefly, this mechanism includes a suction foot 60 positioned above the forward end of the stack. This foot is lowered into contact with the uppermost sheet in the stack, suction applied to draw the sheet into contact with the lower face of the foot, the foot raised to lift such sheet from the stack, and then moved forward to insert the sheet into the bite of a pair of feed rolls 55 and 56 which are rotatably mounted between a pair of spaced separator frame plate 53 carried by the cabinet 10. When the sheet has been inserted in the bite of the feed rolls 55 and 56 the suction is released so that the rolls may advance toward the printing mechanism 12. The suction foot 60 is then returned to its initial position relative to the stack and the cycle of operation repeated.

A detailed description of the mechanism for actuating the suction foot 60 may be had by reference to Patent No. 2,293,046 heretofore mentioned. Suffice it to say that the foot 60 is mounted on a bar 61 which extends between and is journaled in the forward end of a pair of arms 62 (Fig. 3). The opposite ends of these arms are secured to a cross shaft 63 rotatably mounted in the frame plates 53 and extending outwardly through the nearest frame plate. A lever 64 (Fig. 2) is secured to the outer end of the shaft 63 and carries a roller 65 which is retained in contact with a periphery of a cam 66 by a spring, not shown. The cam 66 is pivotally mounted at 67 on the near frame plate 53, and is actuated in timed relation with the printing mechanism 12 by a link 68 which interconnects the cam with a crank 69 rotatably mounted on one of the printing machine frame plates 17 and driven by gearing 71 which drivingly connects it with the transfer or offset cylinder 32.

The suction foot 60 is hollow, open at its lower end, and is connected by a flexible conduit 73 with a suction pump 74 mounted within the base or cabinet 10. This pump is driven by an electric motor 75 which is controlled by a switch 76. A valve mechanism (not shown) is interposed between the pump 74 and the foot 60 to control the time of application of suction to the foot and thus control the gripping and release of the sheet by the foot. A detailed description of a mechanism for this purpose is shown and described in Patent No. 2,358,560 heretofore mentioned.

The suction feeding mechanism may be rendered active and/or inactive as desired without stopping the operation of such printing mechanism. A bell crank 80 is pivoted to the near frame plate 53, one arm of this bell crank extends upward and is provided with an operating handle or knob 81, while the other arm extends rearward and is provided with a lug 82 which normally underlies the rearward end of the suction foot operating lever 64. When it is desired to render the suction feed inactive the bell crank is rocked to bring the lug 82 upward into contact with the lever 64 and rock such lever counterclockwise (Fig. 1) thereby raising the suction foot. If desired, a spring detent, not shown, may exert sufficient tension on the bell crank to retain it in either of its extreme positions to retain the foot active or inactive.

Sheet forwarding mechanism

The feed rollers 55 and 56 forward the separated sheet to the sheet forwarding mechanism 16. This mechanism includes the series of endless tapes 85 heretofore mentioned. These tapes are looped about a roller 86 carried by the separator frame plates 53 and a second roller 87 carried by the printing machine frame plate 17. The feed roller 56 and the tape roller 87 are driven by the printing machine motor 46 through suitable driving components including belts, sheaves, and gearing generally indicated at 88 in Fig. 1.

Receptacle for run-down and printed sheets

Sheets passing through the printing mechanism are discharged into the receptacle 45 heretofore mentioned. This receptacle is mounted at the left hand end of the machine as viewed in Figs. 1, 2 and 3 and is provided with two sheet receiving compartments 90 and 91. Mechanism is provided to enable the sheets to be discharged into either compartment desired.

The receptacle 45 which is secured to the cabinet 10, includes a bottom wall 92, a side wall 93 and an end wall 94. The front of the receptacle is open and is positioned so that the discharged sheets will enter the front of the receptacle.

The receptacle 45 is divided into two compartments by a dividing plate 95 which extends entirely across the receptacle. This plate is pivoted as at 96 to the receptacle end wall 94 and extends generally forward therefrom and is movable between the full line and dotted line positions shown in Fig. 3. When the plate 95 is in the full line position, the sheets are discharged into the upper compartment 90 above the dividing plate 95. When, however, the plate 95 is in its upper or dotted line position the sheets are discharged into the lower compartment 91 between the plate 95 and the bottom wall 92 of the receptacle.

The dividing plate 95 of the receptacle 45 is normally positioned to receive sheets in its upper compartment 90 and is conditioned to receive sheets in its lower compartment by solenoid 97 (Fig. 6). This solenoid is under control of an electric switch 157 and has an armature 99 connected by a link 100 with one arm 103 of a bell crank 101 pivotally mounted on the side wall of the receptacle is at 102. The other arm 104 of this bell crank is provided with an elongated slot 105 which coacts with a pin or roller 106 secured to a lug 107 projecting outwardly from the divider plate 95. This lug is integral with the plate 95 and extends outward through an enlarged opening 108 formed in the receptacle side wall 93. When the solenoid 97 is energized the divider plate moves from its lower position to its upper position against the action of a biasing spring 109 which spring is interposed between the bell crank 101 and the receptacle wall 93. When the solenoid is deenergized the spring 109 returns the dividing plate to its normal or lower position.

Work sheet imprints

Figure 20:
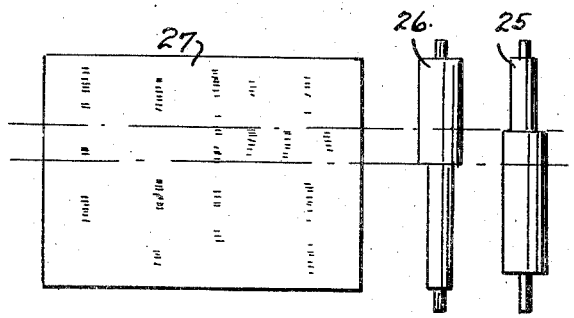

The duplicating mechanism of the present invention is adapted to imprint from either of two portions of the master plate as desired. In the embodiment illustrated one portion includes the entire plate while the other portion includes only a part of the entire plate. However, it is within the scope of the invention to imprint either of two entirely different portions or two overlapping portions, each of which is less than the entire plate. When one portion to be printed is less than the entire plate and the other includes the other plate, one form roll, for instance, the roll 25 is cut-away as indicated in Fig. 20 so that its inking surface extends axially a distance commensurate with a portion of the printing plate desired to be imprinted while the other form roll 26 extends the full width of the printing plate. If desired it is obvious that both form rolls may be cut away as indicated in Fig. 20 to imprint different portions of the printing plate. If the printing plate includes lines of printing characters and the upper lines of the plate are to be imprinted the plate would be applied to the master cylinder with their lines extending peripherally, whereas should an imprint be desired of the right hand portion of each line the plate would be applied to the cylinder with the lines extending axially. Accordingly it will be seen that many combinations of imprints may be secured dependent upon the configuration of the form rolls 25 and 26 and the position of the image on the printing plate.

If desired, the distributing roller 24 which coacts with the upper form roll 25 may be removed and a separate ink supply provided for such form roll. An example of such an ink supply is illustrated, described and claimed in Patent No. 2,456,282 issued December 14, 1948 to my assignee. Thus the imprints made by one form roll could be of a color differing from that made by other form roll, both form rolls in this instance could imprint the entire printing plate if desired.

As heretofore mentioned, present day business methods utilize a group of individual printing plates and often make it desirable to make several imprints from one portion of one printing plate followed by several imprints either from another portion or from the entire portion of such plate, repeating the operating with each printing plate of the group. Under such conditions the sheets to be imprinted are fed by the operator directly upon the sheet advancing tapes 85 and the sheet separator used only to feed the run-down sheets through the machine. These rundown sheets have two purposes, namely, they are used to insure proper inking of the form and to clean the ink from the undesired portions of printing plate.

Control mechanism

The present invention is particularly concerned with a control mechanism whereby, following the positioning of a printing plate on the master cylinder by the operator, a single actuation of a lever or switch will cause the machine to automatically condition itself and to make the desired set of imprints from a single plate without further manipulation or adjustment of the machine controls by the operator.

The control mechanism is generally indicated in Figs. 1 and 2 at 110 as being mounted in a frame 116 positioned on the cabinet 10 below the feeding tapes 85 of the sheet forwarding mechanisms 16 and intermediate the printing and separating mechanisms 10 and 15. The control mechanism is driven from a hand wheel shaft 111 which is journaled in a printing frame member 17 and geared with the platen cylinder 31 in any well known manner. A pulley 112 (Fig. 9) is secured to the shaft 111 and is drivingly connected as by a belt 114 with a pulley 113 secured to one section 115 of a cross shaft journaled on the frame 116. The shaft section 115 is drivingly connected with axially aligned shaft section 117 by a clutch 118. The effectiveness of this clutch is controlled by a linkage 119 terminating in a manually operable lever 120 accessible from the exterior of the cabinet 10, and serving to move the clutch to render and retain it either in active or inactive as desired. When the control mechanism is being used this clutch remains in an active or driving position.

The shaft section 117 drives a control shaft 121 through the medium of a gear reduction unit 122. This unit has an input shaft 123 drivingly connected with the shaft section 117 by suitable fixed pulleys 127 and a driving belt 124. The control shaft 121 extends through the reduction unit and comprises the output shaft thereof. In the present embodiment the gear reduction unit is such that the control shaft 121 will rotate once for each fifty-three (53) revolutions of the master printing cylinder 30. Accordingly, the printing and separating mechanisms, 12 and 15, complete fifty-three cycles of operation for each cycle of operation of the control mechanism. This ratio may be changed as desired by utilizing different reduction units or by interposing a manually operable change speed transmission gear unit between the clutch and the reduction unit or by substituting such a transmission for the gear reduction unit. Change speed gear transmission units are well known at the present time hence a detailed description thereof appears unnecessary here.

In the present embodiment the operator places a printing plate 27 on the master cylinder 30 and then moves a lever 125 to initiate the action of a machine and the control 110. The lever 125 is pivoted as at 126 to the control frame 116. As this lever is swung counterclockwise, (Fig. 7), a link 128 swings a second lever 129 counterclockwise. The lever 129 carries an abutment 130 which coacts with a control button 131 of a normally open electric switch 132 secured to the frame 116, and completes an electric circuit to energize the driving motor 46 of the printing mechanism 12 thus initiating the rotation of a control shaft 121. As the control shaft 121 turns a cam 134 secured thereto coacts with a roller 135 carried by a lever 136 pivoted on a rod 137 carried by the frame 116, and swings such lever counterclockwise moving a latch member 138 into latching engagement with the link 128 thereby retaining the switch lever 129 in its active position and maintaining the electric circuit to the motor 46. The position of the parts at this time is substantially that shown in Fig. 13. As the cam shaft 121 rotates it energizes a signal light 140, positions the sheet receiving receptacle 45 to receive sheets in its lower compartment 91, renders the run-down sheet feeder 18 active, and shortly thereafter brings the plate cylinder 30 into contact with the transfer cylinder 32. These various operations are accomplished by means of cams 141, 142, and 143 which are fixed to the control shaft. These cams cooperate with respective rollers 145 carried by the respective levers 151, 152 and 153 individually pivoted on the rod 137. The rollers 148, as well as the roller 135, are maintained in contact with their respective cams by suitable springs one of which is shown in Fig. 7 at 147 and which are interposed between the respective levers and the frame 116.

A signal light 140 which is visible to the operator is mounted on the frame 116. This light and the sheet receiving receptacle 45 are operated by the cam 141. The lever 151 actuated by the cam 141, carries an abutment 155 which coacts with a switch button 156 of a normally open electric switch 157 secured to the frame 116. This switch is electrically coupled by conductors 158 with the signal light 140 and by conductors 159 with the sheet receiving receptacle solenoid 97. When the lever switch 151 is moved in a clockwise direction (Fig. 10) it serves to energize both the solenoid 97 and the signal light 140.

The effective operation of the suction foot 60 of the sheet feeder is rendered active by the cam 142 which moves to a position to permit the spring 147 to swing the lever 152 clockwise. Whereupon a link 162 pivotally interconnected between the lever 152 and the bell crank 80 operates to swing the bell crank moving the lug 107 thereof free from the suction foot mechanism. This frees the suction foot for normal operation under the impulse of its cam 66 and causes a number of run-down sheets, determined by the cam 142, to be fed through the printing mechanism 12 to insure cleaning of the blanket and proper inking of the printing plate.

The master cylinder 30 is moved into contact with the transfer cylinder 32 by the cam 143. This cam operates to move a lever 153 which is pivotally interconnected by a link 163 with an arm 173 which is secured to the master cylinder adjusting lever 38, heretofore described, bringing the cylinder 30 into active position relative to the transfer cylinder 32.

The upper form roll 25 is swung into active cooperation with the master cylinder 30 by the rotation of the cam 144 which actuates a lever 154 pivoted to the rod 137 as heretofore described. The upper end of this lever is pivotally connected by a link 164 with the adjusting knob 42 of the upper ink roll 25 heretofore described. Accordingly the cam 144 will position the form roll 25 to apply ink to the master plate 27.

The operation of the machine continues for several cycles of operation during which the signal lamp is energized; run-down sheets are automatically fed through the machine; imprinted with the portion of the image of the master 27 which is inked by the form roll 25; and discharged into the lower section of the sheet receiving receptacle. This insures the building up of a proper inked image on both the master plate 27 and the transfer cylinder. At the end of this period the cams 141 and 142 release their levers 151 and 152 permitting the associated springs 147 to return them to their normal or inactive positions whereupon the signal light is extinguished; the sheet receiving receptacle 45 is re-positioned by its spring 109 to receive sheets in its upper compartment 90; and the run-down sheet feeder is rendered inactive by the disabling of the suction foot 60.

The cams are so arranged that several cycles of operation pass during which the master plate cylinder 30 continues its operation with the upper form roll 25 in contact therewith to enable the operator to manually feed the desired number of work sheets to the belts of the sheet forwarding mechanism. The number of cycles so allotted is generally three or four times the number of work sheets required to be imprinted with the image inked by the form roll 25. Following this imprinting period the upper form roll cam 143 moves such roll out of contact with the master 27; the cam 142 moves to again render the run-down sheet feeder active; and the cam 141 again activates the signal light 140 and re-positions the sheet receiving receptacle 45. Substantially at the same time a cam 145 carried by the control cam shaft 121 coacts with its roller 146 to move a lever 175 in a counterclockwise direction. The upper end of this lever is connected by a link 165 with the operating knob 42 for the lower form roll 26 bringing such roll into cooperative relation with the printing plate and inking the image thereon. Several cycles of operation pass under these conditions during which the signal light is illuminated to inform the operator that work sheets are not to be fed. This permits the cleaning of the transfer cylinder 32 and the printing plate 27 and insures the reestablishment of an inked image on that portion of the plate and transfer cylinder which receive ink from the lower form roll 26.

At the end of the above period, the cams 141 and 142 again act to permit their respective cam levers 151 and 152 to return the receptacle to its original position and to render the feeder foot 60 inactive. The cam 141 also acts to dim the signal light thereby indicating to the operator that the second set of work sheets may be fed to the machine. A sufficient period of time is permitted to elapse with the lower form roll 26 in contact with the master plate 27; the master cylinder 30 in contact with the transfer cylinder to enable the imprinting of the desired number of forms with that portion of the image inked by the lower form roll 26. In this case also, a larger number cycles of operation are permitted to elapse than the number of forms required.

At the end of the above period, the master cylinder 30, the lower form roll 26 are rendered inactive by their respective cams. Shortly thereafter the cam 134 acts through its lever 136 and the latch 138 to return both the switch lever 129 and the operating lever 125 to their normal or idle positions. The return of the switch lever 129 to its normal position stops the drive to both the printing machine 12 and the control mechanism 110 as it immediately deenergizes the driving motor 46. The duplicating machine is now in position to repeat the cycle of operation with another printing plate.

If desired, a series of run-down sheets may be passed through the machine to clean the transfer and master cylinders prior to the completion of the cycle of operation of the control mechanism. If this is desired the ink form roll 26 will be moved to an idle position by its cam 145 at the completion of the period allotted for the second set of imprints; the cams 143 and 134 will retain the motor 46 and the master cylinder 30 active; and the cam 141 and 142 will again act to energize the feeder, the receptacle solenoid 97 and the signal light 140. After the number of run-down sheets required for cleaning purposes have been fed, the various cams will operate to return their respective mechanisms to their normal or idle positions and stop the machine, as heretofore described.

In Fig. 16 a suggested timing arrangement for one cycle of operation of the control mechanism 110 has been indicated. In this figure the heavy horizontal lines represent periods of activity of the various operations while the vertical lines represent cycles of operation of a printing mechanism.

At times it was found desirable to enable the operator to stop the operation of the machine at any time during its automatic operation as, for instance, when a sheet becomes folded or otherwise jammed in the mechanism. This is permitted by means of a peculiar arrangement of the link 128 which interconnects the operating lever 125 with the switch lever 129, the latch 138 which couples the switch lever with its associated cam lever 136, and the switch lever 129. In Fig. 7 the parts are shown in their normal position prior to the actuation of the operating lever 125. The latch member 138 is in latching engagement with the link 128. The latching engagement between the switch lever 129 and the latch 138 is released by the initial movement of the operating lever 125 to thereby permit movement of such lever for initiating the operation of the mechanisms. The movement of the operating lever 125, against the action of a comparatively light spring 170, due to a pin and slot connection 179, 180 between the link 128 and the switch lever 129, permits a slight movement of the link before the switch lever is picked up. During this movement a cam surface 181 of the link coacts with a cam surface 182 of the latch 138 and raises the latch to its uppermost position in which a pin 183 carried by the switch lever 129 and which normally seats in a vertically extending portion 184 of a latching recess formed in the latch lines in an elongated substantially horizontal portion 185 of such slot. This release of the latch permits the continued movement of the lever 125 and the link 128 to swing the switch member 129 in a counterclockwise direction. The latch 138 is normally positioned with its vertical slot portion 184 in engagement with the pin 183 by a comparatively strong compression spring 186 interposed between the latch and its associated operating lever 136. The elongated slot portion 185 permits operating lever 132 to move the switch lever 129 and energize the switch 132 initiating the operation of the cam shaft 121. Whereupon the cam 134 and spring 186 return the latch member 138 to its normal position relative to the pin 183 and the switch lever 129 again is under control of the cam 134. This position of the parts is shown in Fig. 13.

To disable the mechanisms while the control 110 is operating, the operator moves the control lever 125 clockwise, supplementing the force of the spring 170, whereupon the lost motion connection 179, 180 permits a cam surface 188 of the lever 128 to coact with a cam surface 189 of the latch and swing the latch out of latching engagement with the pin 183 against the action of its spring 186. Continued clockwise movement of the operating lever 125 swings the switch lever 129 in a clockwise direction, the pin 183 moving freely in the elongated horizontal slot portion 185 as indicated in Fig. 15. This permits the switch 132 to return to its normal or open position. When it is desired to reestablish the operation of the machine it is only necessary for the operator to swing the operating lever 125 counterclockwise, repositioning the switch lever through the pin and slot connection 179, 180 and returning the parts to the position shown in Fig. 13.

When it is desired to operate the machine manually or to operate it automatically with work sheets from the sheet feeder the operator actuates the lever 120 which causes the clutch 118 to disconnect the control mechanism 110 from its drive whereupon the motor 46 may be energized by a shunting switch 190 carried by the cabinet 10 and the various parts may be manually positioned as desired. Each of the levers which connect the various mechanisms, namely, the sheet feeder lever 152, the two ink form roll levers 153 and 154, and the master or plate cylinder lever 155, are connected by pins and slot connection such as generally shown in Fig. 9 with their respective links 162, 163, 164 and 165. Each connection includes a bayonet-like slot 195 formed in the respective link and pin 196 carried by the associated lever, the pin being normally retained in the uppermost portion of the slot by a spring 197. When it is desired to position these parts manually the operator raises a handle 198 attached to the respective link and moves the link itself to make the desired conditioning adjustment.

Following the operation of the machine with the control 110 disconnected, the machine reconditioned or automatically re-timed relative to the control 110 by merely permitting the latter to pass through one complete cycle of is operation whereupon automatic operation may be resumed.

The sheet feeding mechanism may be disabled at any time without affecting the other mechanisms. For this purpose the link 163 which connects the sheet feeding mechanism with its control lever is a two-part link, one end of each overlapping the other, one link part carries a pin 200 and the other part has an elongated slot 201. A pair of springs 202 extend from the pin 200 to either end of this slot so that normally the link operates as a single unit through the medium of the springs. When, however, it is desired to render the sheet feed inactive the springs

I claim:

1. A duplicating machine having an imprinting means including a master printing plate cylinder and impression means including a printing cylinder coacting with the master cylinder to imprint worksheets, an ink applicator for inking the printing plate cylinder, a second ink applicator for applying ink to the printing plate cylinder, means to render said applicators individually active or inactive as desired, power means to rotate said cylinders, and a power operated control mechanism responsive to rotation of said cylinder including means operative to render the first named ink applicator active and the second named applicator inactive for a predetermined number of cycles of rotation of said cylinders and to then render the first named applicator inactive and the second applicator active for a predetermined number of cycles of rotation of said cylinders.

2. A rotary duplicating machine including a master cylinder having a printing plate removably secured to its periphery, a transfer cylinder coacting therewith, a platen cylinder coacting with said transfer cylinder, an ink applicator for inking the printing plate, a second ink applicator for applying ink to the printing plate, at least one of said applicators being adapted to apply ink to a portion of the printing plate not inked by the other applicator, means to render said applicators individually active or inactive as desired, power operated means to rotate said cylinders, a control mechanism including means operative to render the first named ink applicator active and the second named applicator inactive for a plurality of consecutive cycles of rotation of said cylinders, and then render the first named applicator inactive and the second named applicator active for a plurality of consecutive cycles of operation of said cylinders, and means interconnecting said control mechanism with said master cylinder to cause said control mechanism to act automatically in response to the rotation of said cylinder.

3. A duplicating machine according to claim 1 having a sheet feeder mechanism to feed a sheet to said imprinting means for each cycle of rotation of said cylinders, power operated driving means for said feeder mechanism, means to render said feeder active or inactive as desired, and wherein said control mechanism includes means responsive to the rotation of said cylinders to render said feeder active for a predetermined number of cycles of rotation of said cylinders during a first portion of the active period of each ink applicator and idle during remaining portion of such active periods.

4. In a duplicating machine according to claim 3 signal means, and means actuated by said control mechanism to actuate said signal means to indicate to an operator that said feeder is active.

5. In a duplicating machine according to claim 2, wherein the master cylinder and ink applicators are movable relative to said impression means as a unit to move the master cylinder into and out of cooperation with said coacting impression means, positioning means to control the relative position of said master cylinder and impression means, and means interconnecting said positioning means with said control mechanism to retain said master cylinder in cooperation with said impression means for a predetermined number of cycles of revolution of said cylinder.

6. In a duplicating machine according to claim 3, means whereby the operator may feed work sheets to the imprinting means independent of the operation of said feeder and when the feeder is idle, and means rendered active by said control automatically in response to the rotation of said cylinders to separate sheets fed by said feeder and discharged by said printing cylinders from sheets fed by the operator during an idle period of said feeder.

7. A duplicating machine according to claim 6, wherein said last named means includes a sheet receiving receptacle having two compartments, a divider plate separating said compartments and movable to selectively cause sheets to be discharged into the selected compartment, a solenoid, an operating connection between said solenoid and said plate, a switch to control the application of electric energy to said solenoid, and wherein said control mechanism includes means to actuate said switch in response to the rotation of said cylinder.

8. A duplicating machine according to claim 1 having an electric motor, a driving connection between said motor and said printing cylinders, a switch to control the application of electrical energy to said motor, manually operable means under control of the operator to actuate said switch to render said motor active, and means actuated by said control mechanism in response to the rotation of said cylinders to retain said switch in its active position for a predetermined number of cycles of rotation of said cylinders and to then render said switch inactive.

9. A duplicating machine according to claim 8, wherein said last named means includes a releasable latch, and means including said manually operable means to release said latch and render said switch inactive at any time during any cycle of rotation of said cylinders.

10. In a duplicating machine according to claim 8, a driving connection including a speed reduction unit disposed between and drivingly connected to the printing cylinders and to said control mechanism.

11. In a duplicating machine according to claim 10, a clutch operatively connecting said speed reduction unit with said cylinders, and manually operable means to actuate said clutch.

12. In a duplicating machine according to claim 11, a common frame in which said master cylinder and ink applicators are mounted, said frame being movable to bring the master cylinder into and out of cooperation with the impression means positioning means to control the relative position of said cylinder and said impression means and means operatively interconnecting said positioning means with said control mechanism to move the frame in response to the rotation of said cylinders.

13. A duplicating machine according to claim 12, wherein one ink applicator includes means to ink a portion of a master plate carried by the master cylinder not inked by the other applicator.

14. A control mechanism for a rotary duplicating apparatus having a master cylinder, a transfer cylinder, a platen cylinder, a pair of ink applicators, each applicator including means to supply ink to a printing plate mounted on said master cylinder, regulating means to move the master cylinder into and out of cooperation with the transfer cylinder, an independent regulating means for moving each applicator into and out of cooperation with a printing plate carried by the master cylinder, means whereby work sheets may be fed to the bite of said platen and transfer cylinders, and a common driving motor for said apparatus, said control mechanism including a cam shaft, a driving connection between said cam shaft and said motor, said connection including a speed reducing unit, a cam on said shaft for each of said regulating means, a cam follower for each cam, linkage operatively connecting each follower with its respective regulating means, a motor control cam on said shaft, a cam follower for said motor control cam, a normally open electric switch to control the source of energy to said motor, a lever to actuate said switch, a latch connecting said last named cam follower with said lever, a manually controlled operating lever, means responsive to said operating lever to release said latch and actuate said switch.

15. In a control mechanism for a rotary duplicating apparatus according to claim 14, means including said latch switch lever and said control cam to restore the latch to its active position to thereby retain said switch closed for a predetermined number of cycles of revolution of said cylinders.

16. A control mechanism for a rotary duplicating apparatus having a master cylinder, a transfer cylinder, a platen cylinder, a pair of ink applicators to individually supply ink to a printing plate mounted on said master cylinder, on one of said applicators including means to supply ink to a portion of the printing plate not supplied by the other applicator, regulating means to move the master cylinder into and out of cooperation with the transfer cylinder, an independent regulating means for moving each applicator into and out of cooperation with a printing plate carried by the master cylinder, a sheet feeding mechanism to automatically feed sheets one at a time to the bite of the transfer and platen cylinders, means whereby work sheets may be manually fed to said bite, and a receptacle having two sheet receiving compartments, regulating means to cause sheets discharged by said cylinders to enter either compartment as desired, a common electrically operated driving motor for said apparatus, regulating means to control the effective operation of said feeder, said control mechanism including a cam shaft, a driving connection between said cam shaft and said motor, said connection including a speed reducing gear unit disposed between the shaft and motor, a cam on said shaft for each of said regulating means, a cam follower for each cam, linkage operatively connecting each follower with its respective regulating means, a motor control cam on said shaft, a cam follower for said motor control cam, a normally open electric switch to control the source of energy to said motor, a lever to actuate said switch, a latch connecting said last named cam follower with said lever, a manually controlled operating lever, means responsive to said operating lever to release said latch and actuate said switch, and means including said latch, switch lever and said control cam to restore the latch to its active position and retain said switch closed for a predetermined number of cycles of revolution of said cylinders.

17. In a control mechanism for a rotary duplicating machine according to claim 16, a signal lamp, a normally open switch to control the source of energy to said lamp, and means responsive to one of said cam followers to control the operation of said switch.

18. A control mechanism for a rotary duplicating apparatus having a master cylinder, a transfer cylinder, a platen cylinder, a pair of ink form roll to supply ink to a printing plate mounted on said master cylinder, eccentric regulating means to move the master cylinder into and out of cooperation with the transfer cylinder, an independent eccentric regulating means for moving each form roll into and out of cooperation with a printing plate carried by the master cylinder, a sheet feeding mechanism to automatically feed run-down sheets one at a time to the bite of the transfer and platen cylinders, means whereby work sheets may be manually fed to said bite, and a receptacle having two sheet receiving compartments, regulating means to cause sheets discharged by said cylinders to enter either compartment as desired, a common driving motor for said apparatus, and regulating means to control the effective operation of said feeder, said control mechanism including a cam shaft, a driving connection between said cam shaft and said motor, said connection including a speed reducing gear unit disposed between the shaft and motor and a manually operable normally active clutch disposed between said unit and said motor, a cam fixed to said shaft for each of said regulating means, a cam follower for each cam, linkage operatively connecting each follower with its respective regulating means and including a manually releasable connection, a motor control cam on said shaft, a cam follower for said motor control cam, a normally open electric switch to control the source of energy to said motor, a lever to actuate said switch, a latch connecting said last named cam follower with said lever, a manually controlled operating lever, means responsive to said operating lever to release said latch and actuate said switch, and means including said latch, switch lever and said control cam to restore the latch to its active position and retain said switch closed for a predetermined number of cycles of revolution of said cylinders.

19. A duplicating machine having an imprinting means including a master printing plate cylinder and impression means including a printing cylinder coacting with the master cylinder to imprint worksheets, an ink applicator for inking the printing plate cylinder, a second ink applicator for applying ink to the printing plate cylinder, means to render said applicators individually active or inactive as desired, means to rotate said cylinders, and a control mechanism including means operative to render the first named ink applicator active and the second named applicator inactive for a predetermined number of cycles of rotation of said cylinders and then render the first named applicator inactive and the second applicator active for a predetermined number of cycles of rotation of said cylinders, a sheet feeder mechanism to feed a sheet to said imprinting means for each cycle of rotation of said cylinders, means to render said feeder active or inactive as desired, said control mechanism including means to render said feeder active for a predetermined number of cycles of rotation of said cylinders during a first portion of the active period of each ink applicator and idle during remaining portion of such active periods, signal means, means actuated by said control to actuate said signal means to indicate to an operator that said feeder is active. A power operating means to rotate said cylinders, and a driving connection between said driving means and said control mechanism to drive the control mechanism in timed relation with the rotation of the printing cylinders.

20. A duplicating machine according to claim 19, wherein said last named means includes a releasable latch, and means including said manually operable means to release said latch and render said driving connection inactive at any time during any cycle of rotation of said cylinders.

21. In a duplicating machine according to claim 20, wherein said driving connection includes a speed reduction unit, a clutch disposed between said driving unit and said cylinders, and manually operable means to control such clutch.

22. A duplicating machine having impression means including a printing plate cylinder, a transfer cylinder coacting with the plate cylinder to receive an inked impression therefrom, an impression cylinder coacting with the transfer cylinder to imprint work sheets passed therebetween, an ink applicator for applying ink to the printing plate cylinder, means to render said applicator active or inactive as desired, means whereby sheets to be imprinted may be fed to the imprinting means, a sheet feeding mechanism to feed other sheets one at a time to said imprinting means, means to render said feeding mechanism active and inactive as desired, power operated means to rotate said cylinders and drive said sheet feeding mechanism in repeating cycles of operation, means to receive sheets from said impression means, and a control mechanism, a driving connection between said power operated means and said control mechanism to drive said control mechanism in timed relation to the rotation of said cylinders, said control mechanism including power operated means to sequentially render said inking mechanism active and said feeding mechanism inactive for a predetermined number of impression cycles of rotation of said cylinders and automatically to thereafter render said inking mechanism inactive and said feeding mechanism active for a predetermined number of cycles of rotation of said cylinders, whereby sheets to be imprinted may be fed while the inking mechanism is active and "run-down" sheets may be fed by said feeding mechanism when the inking mechanism is inactive to remove ink from said cylinders.

23. In a duplicating machine according to claim 22, a receptacle to receive sheets discharged by the impression mechanism including a sheet separating device, and power operated means responsive to said control mechanism to separate "run-down" sheets fed by said feeding mechanism from sheets fed to said imprinting mechanism while the ink applicator is active.

24. A duplicating machine according to claim 22 wherein said power operated means includes a motor, a driving connection between said motor and said cylinders, said control mechanism including a cam shaft, a driving connection between said cam shaft and said motor, said last named driving connection including a speed reducing unit.

25. In a duplicating apparatus according to claim 24 a plurality of cams on said cam shaft, a cam follower for each cam, linkage connecting one follower with said ink applicator to control said applicator in response to the respective cam, linkage connecting another of said cams with said feeding mechanism, and manually settable means to disable either of said linkages as desired.

26. In a duplicating apparatus according to claim 25, a motor control cam on said cam shaft, a cam follower for said last named cam, a normally open switch to control the source of energy to said motor, a lever to actuate said switch, a latch connecting said lever with said last named cam follower, a manually controlled operating lever, and means responsive to said operating lever to release said latch and actuate said switch.

27. In a control mechanism for a rotary duplicating machine according to claim 26, means including said latch, said latch switch lever, and said control cam to restore the latch to its active position to thereby retain said switch closed for a predetermined number of cycles of revolution of said cylinders.

28. A rotary offset duplicating machine having imprinting means including a printing plate cylinder, a coacting transfer cylinder, an impression cylinder coacting with the transfer cylinder, an ink applicator to apply ink to the plate cylinder, means to render said applicator active or inactive as desired, sheet forwarding means to forward sheets to the bite of said impression and transfer cylinders and adapted to receive sheets from two sources, one of said sources including a sheet feeder to feed sheets one at a time from a stack to said forwarding means, means to render said feeder effective or ineffective as desired, power operated means to rotate said cylinders and operate said feeder in repeating cycles of operation, sheet receiving means to receive imprinted sheets, a power operated control mechanism operating in timed relation to the rotation of said cylinders said mechanism including means to render said inking mechanism active and said feeder ineffective for a predetermined number of consecutive cycles of operation of said imprinting means to permit imprints to be made from sheets manually fed to said forwarding means and automatically thereafter render said inking mechanism inactive and said feeder effective for a predetermined number of consecutive cycles of operation of said imprinting means to permit sheets fed by said feeding mechanism to pass to said impression means.

29. A duplicating machine according to claim 27 having a receptacle to receive sheets passing from the imprinting means and including a sheet separator, and means responsive to said control mechanism to actuate said separator to separate sheets fed by said feeder from other sheets fed to said forwarding means.

30. A control apparatus to automatically control the operation of a rotary offset duplicating machine having imprinting means including a printing plate cylinder, a transfer cylinder coacting with the plate cylinder, an impression cylinder coacting with the transfer cylinder, an ink form roll to apply ink to the plate cylinder said roll being movable into and out of contact with the plate cylinder, forwarding means to forward sheets to the bite of the impression and transfer cylinders and adapted to receive sheets from two sources, one of said sources including a sheet feeding means to feed sheets one at a time and adapted to become effective or ineffective as desired, power operated means to rotate said cylinders and to operate said sheet feeding and forwarding means in timed relation with each other, and a sheet receiving means for sheets discharged by said cylinders, a control mechanism, a power actuated means connected to operate the control mechanism in timed relation to the rotation of the cylinders, means controlled by said control mechanism to cause said cylinders, said feeding means, and said forwarding means to operate for a predetermined number of successive cycles of operation, said control mechanism including means to move said form roll into contact with the plate cylinder and to render said feeding means ineffective and maintain such condition for a predetermined portion of said cycles of operation and thereby permit imprints to be made from sheets manually fed to said forwarding means and to thereafter automatically move said form roll away from said plate cylinder and render said feeding means effective for a subsequent predetermined portion of said cycles of operation to thereby permit sheets fed by said feeding mechanism to pass to said impression means, said control mechanism including means acting subsequent to said last named portion and prior to the expiration of said predetermined number of cycles to render said feeding means ineffective, and means to stop the rotation of said cylinders at the expiration of said predetermined number of cycles of operation.

31. In a control mechanism to control the sequence of operation of a duplicating machine according to claim 30, a manually operable member, means interconnecting said member with said control mechanism to stop the operation of said control mechanism, said cylinders and said feeding means at any time during said predetermined number of cycles of operation and consequent upon manual operation of said member, and means to cause said control mechanism, said cylinders and feeding means to again become active and complete the predetermined number of cycles consequent upon a subsequent manual operation of said member.

32. A control mechanism for a rotary offset duplicating machine having imprinting means including a printing plate cylinder, a transfer cylinder coacting therewith, an impression cylinder coacting with the transfer cylinder, an ink applicator to apply ink to the plate cylinder, means to render said applicator active or inactive as desired, means to forward sheets to be imprinted to the bite of said impression and transfer cylinders, cleaning means to remove ink from the surface of said transfer cylinder, means to render said cleaning means active or inactive as desired, power operated means to rotate said cylinders and operate said forwarding and said cleaning means, said control mechanism including a power operated means connected to drive said control mechanism in timed relation with the rotation of said cylinders, means controlled by said mechanism to cause said first named power operated means to become active to actuate said cylinders and said forwarding means for a predetermined number of successive cycles of operation, said control means including means to render said ink applicator active and said cleaning means inactive for a predetermined portion of said cycles of operation to cause imprints to be made from sheets fed to said forwarding means and to thereafter automatically render said applicator inactive and said cleaning means active for a predetermined portion of said cycles of operation, said control mechanism including means acting subsequently to said last named portion and prior to the expiration of said predetermined number of cycles to render said cleaning means ineffective, and means under control of the operator to initiate the action of said control means.

33. A duplicating machine according to claim 32 wherein said power operated means includes a motor, a driving connection between said motor and said cylinders, said control mechanism including a cam shaft, and a driving connection between said cam shaft and said motor, said last named driving connection including a speed reducing unit.

34. In a duplicating apparatus according to claim 33 a plurality of cams on said cam shaft, a cam follower for each cam, linkage connecting one follower with said ink applicator to control said applicator in response to the respective cam, linkage connecting another of said cams with said cleaning means, and manually settable means to disable either of said linkage as desired.

35. In a duplicating apparatus according to claim 34, a motor control cam on said cam shaft, a cam follower for said last named cam, a normally open switch to control the source of energy to said motor, a lever to actuate said switch, a latch connecting said lever with said last named cam follower, a manually controlled operating lever, and means responsive to said operating lever to release said latch and actuate said switch.

36. In a control mechanism for a rotary duplicating machine according to claim 35, means including said latch, said latch switch lever, and said control cam to restore the latch to its active position to thereby retain said switch closed for a predetermined number of cycles of revolution of said cylinders.

References Cited in the file of this patent

UNITED STATES PATENTS

| | | |
|---|---|---|
| 1,774,762 | Roesen | Sept. 2, 1930 |
| 1,825,217 | Tufts et al. | Sept. 29, 1931 |
| 1,949,432 | Osborn | Mar. 6, 1934 |
| 1,220,255 | Marchev et al. | Nov. 5, 1940 |
| 2,335,954 | Neal | Dec. 7, 1943 |